United States Patent
Hemerson (10) Patent No.: US 10,568,252 B2
(45) Date of Patent: Feb. 25, 2020

(54) FIELD CULTIVATOR SWEEP

(71) Applicant: Albert R. Hemerson, Gilmore City, IA (US)

(72) Inventor: Albert R. Hemerson, Gilmore City, IA (US)

( * ) Notice: Subject to any disclaimer, the term of this patent is extended or adjusted under 35 U.S.C. 154(b) by 0 days.

(21) Appl. No.: 15/932,799

(22) Filed: Apr. 26, 2018

(65) Prior Publication Data

US 2018/0249619 A1 Sep. 6, 2018

Related U.S. Application Data

(63) Continuation of application No. 15/603,778, filed on May 24, 2017, now abandoned, which is a continuation of application No. 15/452,120, filed on Mar. 7, 2017, now abandoned.

(60) Provisional application No. 62/385,757, filed on Sep. 9, 2016, provisional application No. 62/384,579, filed on Sep. 7, 2016, provisional application No. 62/383,945, filed on Sep. 6, 2016, provisional application No. 62/339,592, filed on May 20, 2016, provisional application No. 62/305,339, filed on Mar. 8, 2016.

(51) Int. Cl.
*A01B 35/26* (2006.01)
*A01B 13/08* (2006.01)
*A01B 37/00* (2006.01)
*A01B 23/02* (2006.01)

(52) U.S. Cl.
CPC .............. *A01B 35/26* (2013.01); *A01B 13/08* (2013.01); *A01B 37/00* (2013.01); *A01B 23/02* (2013.01)

(58) Field of Classification Search
CPC ......... A01B 35/26; A01B 13/00; A01B 13/02; A01B 15/04
USPC ......................................................... 172/725
See application file for complete search history.

(56) References Cited

U.S. PATENT DOCUMENTS

| | | | | |
|---|---|---|---|---|
| 709,901 | A * | 9/1902 | Hankins | A01B 35/26 172/722 |
| 1,143,907 | A * | 6/1915 | Hedges | A01B 35/26 172/720 |
| 1,381,028 | A * | 6/1921 | Stevenson | A01B 41/00 172/724 |
| 1,504,937 | A * | 8/1924 | Burnett | A01B 13/02 172/738 |
| 1,531,340 | A * | 3/1925 | Jackson | A01B 35/26 172/725 |
| 2,699,104 | A * | 1/1955 | Jaeger | A01B 35/02 172/724 |

(Continued)

*Primary Examiner* — Thomas B Will
*Assistant Examiner* — Joel F. Mitchell
(74) *Attorney, Agent, or Firm* — McKee, Voorhees & Sease, PLC (57) ABSTRACT

The field cultivating sweep includes a body with wings extending from a center line in opposite directions, and a conditioning element extending downwardly from the wing body. The conditioning element may be a blade extending vertically downwardly along the center line of the body and having a leading edge sloped rearedly from front to back. In alternative embodiments, the conditioning element may have a triangular or rectangular shape or may be in the form of a fluted coulter. The conditioning element acts to till the ground vertically and break up compacted soil as the sweep is drawn along the ground.

15 Claims, 8 Drawing Sheets

(56) References Cited

U.S. PATENT DOCUMENTS

| | | | | |
|---|---|---|---|---|
| 3,038,424 A | * | 6/1962 | Johnson | A01C 23/025 |
| | | | | 111/124 |
| 4,141,301 A | * | 2/1979 | Coldren | A01C 23/025 |
| | | | | 111/123 |
| 4,142,588 A | * | 3/1979 | Doss | A01B 13/02 |
| | | | | 172/190 |
| 4,825,782 A | * | 5/1989 | Mikkelsen | A01B 35/26 |
| | | | | 111/123 |
| 5,001,995 A | * | 3/1991 | Mikkelsen | A01B 35/26 |
| | | | | 111/123 |
| 5,433,277 A | * | 7/1995 | Davison | A01B 13/08 |
| | | | | 111/200 |
| 7,055,619 B2 | * | 6/2006 | Linnebur et al. | A01C 5/062 |
| | | | | 111/124 |
| 10,314,221 B2 | | 6/2019 | Balvanz | |
| 2017/0238454 A1 | * | 8/2017 | Balvanz | A01B 13/08 |

* cited by examiner

FIELD CULTIVATOR SWEEP

CROSS-REFERENCE TO RELATED APPLICATIONS

This is a Continuation Application of U.S. Ser. No. 15/603,778, filed on May 24, 2017, which is a Continuation Application of U.S. Ser. No. 15/452,120, filed Mar. 7, 2017, which claims priority to previously filed provisional applications U.S. Ser. No. 62/385,727, filed on Sep. 9, 2016; U.S. Ser. No. 62/384,579, filed Sep. 7, 2016; U.S. Ser. No. 62/383,945, filed on Sep. 6, 2016; U.S. Ser. No. 62/339,592, filed May 20, 2016; and U.S. Ser. No. 62/305,339, filed on Mar. 8, 2016; all of which are herein incorporated by reference in their entirety.

FIELD OF THE INVENTION

The present invention relates to a tool for improved soil tillage, and particularly to an agricultural field cultivator sweep having a soil conditioner for improved vertical tillage.

BACKGROUND OF THE INVENTION

Field cultivator sweeps are well known in the agricultural industry. These sweeps are pulled through the ground to loosen the soil for seeding. These sweeps are also used to remove weeds which otherwise absorb nutrients and moisture from the soil.

Conventional filed cultivator sweeps have a V-shaped body formed by opposing wings, with a pointed nose on the body. The wings generally reside in a horizontal plane and have an upstanding neck which connects to a shank of the cultivator using bolts or other known attachment means, such as clamps, pins, screws, and welding. The sweeps are drawn through soil at a depth of a few inches below the surface.

In operation, the conventional cultivator sweeps do a reasonably good job of ripping weeds from the soil, while creating some loosened soil. However, the sweeps have a tendency to compress the soil beneath the sweep, which makes it difficult for the roots of the crop to grow into or below the compressed soil. As a result, the roots tend to grow horizontally along the compressed soil, rather than growing downwardly through the compressed soil.

Therefore, there is a need for an improved filed cultivator sweep which eliminates or minimizes compression of soil during use of the sweep.

Accordingly, a primary objective of the present invention is the provision of a field cultivating sweep having a soil conditioning element to break up compressed soil and thereby promote plant root growth.

Another objective of the present invention is the provision of a field cultivator sweep having a body with opposing wings, and a downwardly extending blade to till the soil in a vertical direction.

A further objective of the present invention is the provision of a field cultivator sweep having a vertically oriented lower blade with a leading edge extending at an angle between 30°-60° so as to create a vertical slit in the soil without sideways displacement of the soil.

Still another objective of the present invention is the provision of a method of cultivating soil by drawing a filed cultivating sweep with a vertical blade through the soil for vertical tillage.

Another objective of the present invention is the provision of an improved field cultivator sweep which minimizes noise and minimizes stress on the farming equipment during use.

A further objective of the present invention is the provision of a field cultivator sweep having a stabilizing rudder which minimizes vibrations, shock, and bounce as the sweep is drawn through the field, and thereby reduce material loss in the sweep and increase the life of the sweep.

Yet another objective of the present invention is the provision of an improved agricultural sweep which is economical to manufacture, easy to install, and durable in use.

These and other objectives have become apparent from the following description of the invention.

SUMMARY OF THE INVENTION

The field cultivator sweep of the present invention includes opposite left and right wings which extend outwardly and rearedly from a center line so as to form a symmetrical body with a V-shaped leading edge. An upstanding neck is provided on the body for mounting to sweep to a shank of a cultivator. A soil conditioning element extends downwardly from the bottom of the body. In a preferred embodiment, the conditioning element is a flat blade with a rearwardly angled leading edge. The blade creates a vertical slit in the soil as the sweep is pulled through the ground, thereby minimizing soil compaction and enhancing plant root growth.

DETAILED DESCRIPTION OF THE INVENTION

Figure 1:
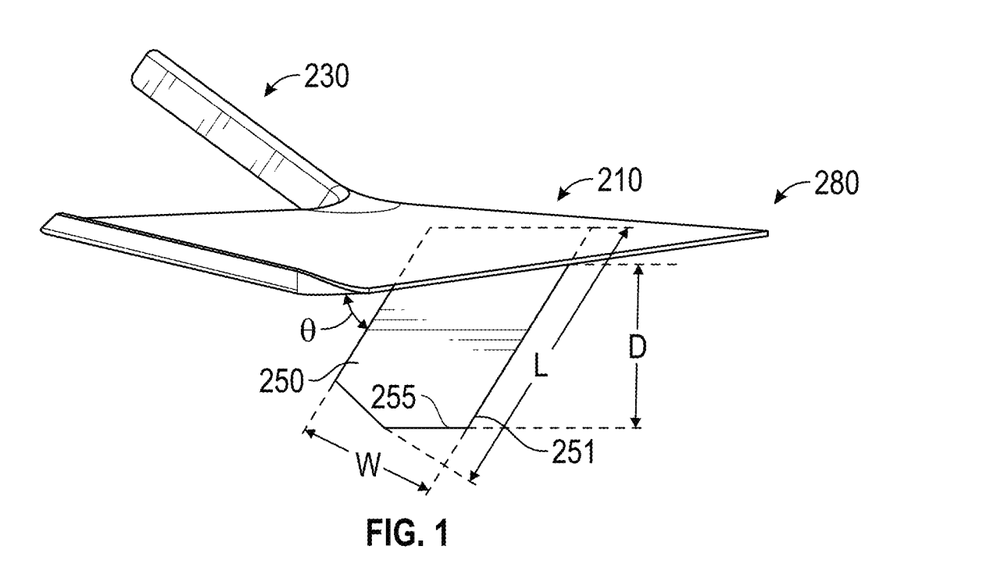
FIG. 1 is a side elevation view of the field cultivator sweep according to the present invention.
Figure 2:
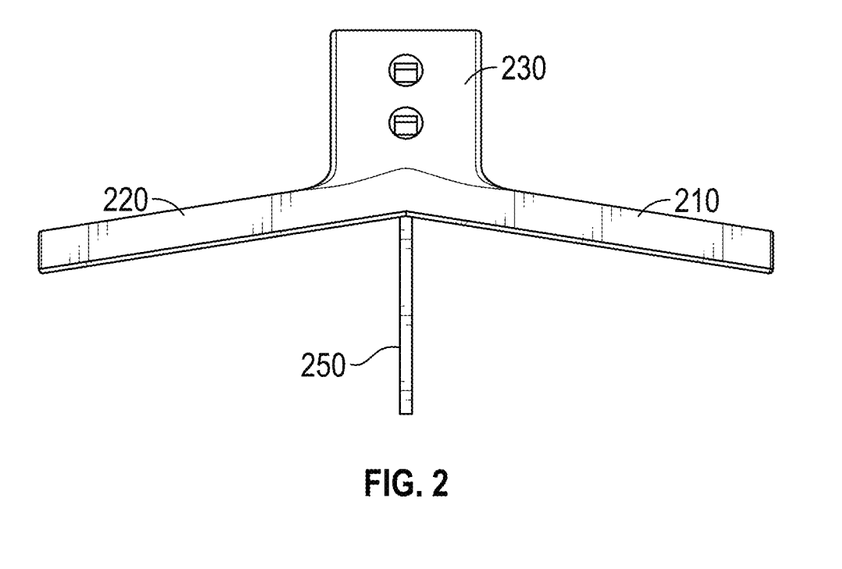
FIG. 2 is a front elevation view of the sweep.

FIGS. 1-4 show a preferred embodiment of a field cultivator sweep 200 in accordance with the present invention. The field cultivator sweep 200 includes a first wing 210 and second wing 220, together forming a wing body, and an upstanding neck 230 at the rear of the body. The neck 230 is configured to attach to a shank of a cultivator. To this end, the neck 230 may include a plurality of apertures to connect the cultivator sweep 200 to the shank. For example, in FIG. 2 the field cultivator sweep 200 is illustrated as having two apertures 232 and 234 to allow the field cultivator sweep 200 to connect to the shank by a pair of bolts. It is understood the above connecting method is merely exemplary as the field cultivator sweep 200 may be attached to the shank by a different method, for example, by clamps, pins, screws, and welding. Furthermore, the number of apertures illustrated in FIG. 2 is not meant to be a limiting feature since some embodiments of the cultivator sweep 200 may include only a single aperture, more than two apertures, or even no apertures.

Figure 3:
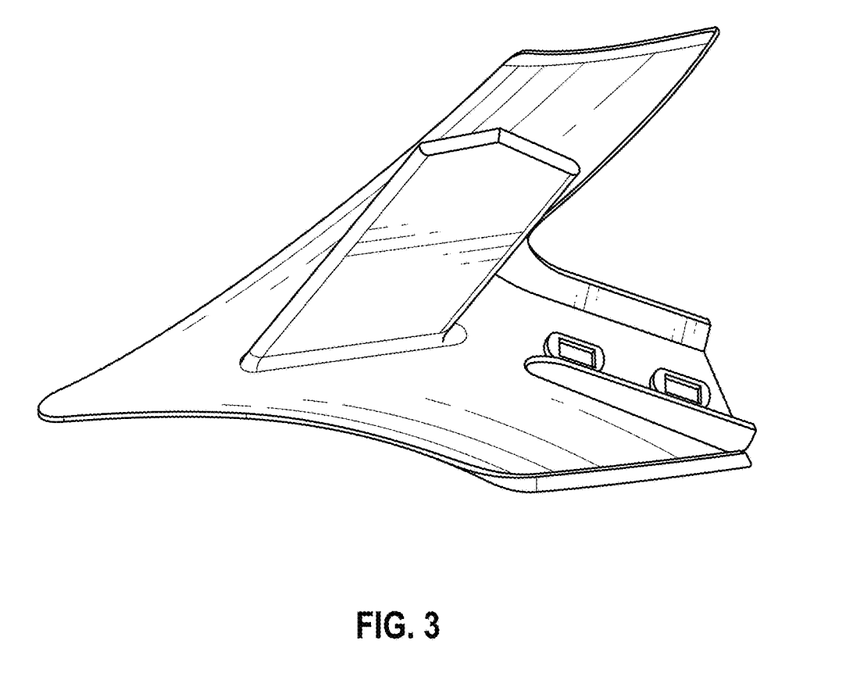
FIG. 3 is a lower perspective of the sweep.
Figure 4:
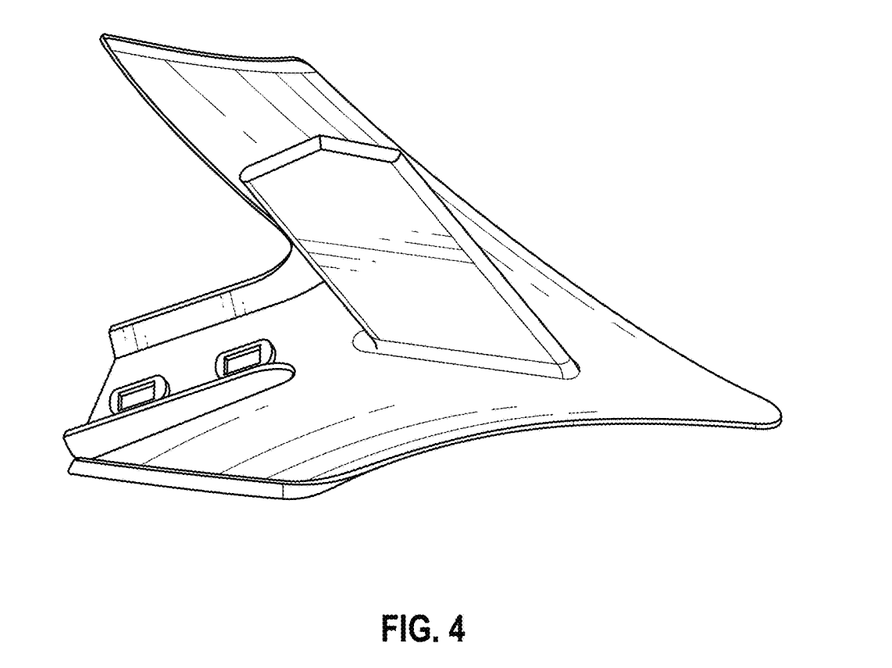
FIG. 4 is another lower perspective of the sweep from a different perspective than FIG. 3.
Figure 5:
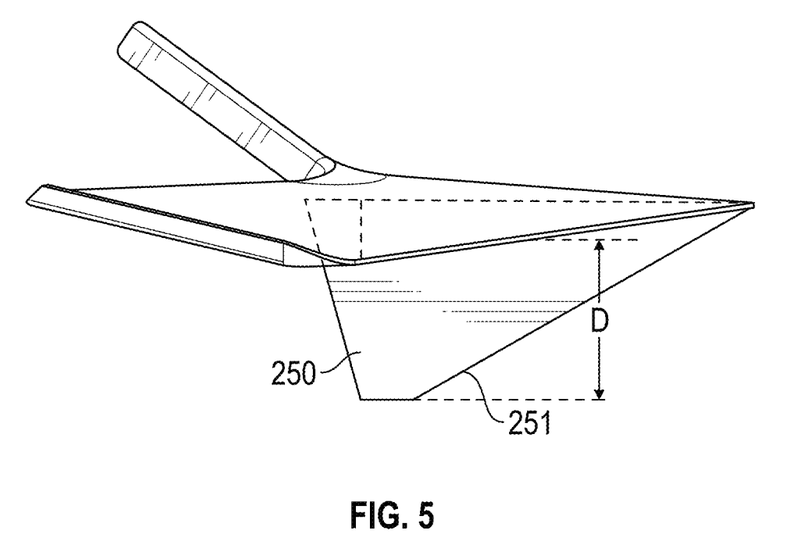
FIG. 5 is a side elevation of a first embodiment wherein the conditioning element has a leading edge extending to the front nose of the sweep.
Figure 6:
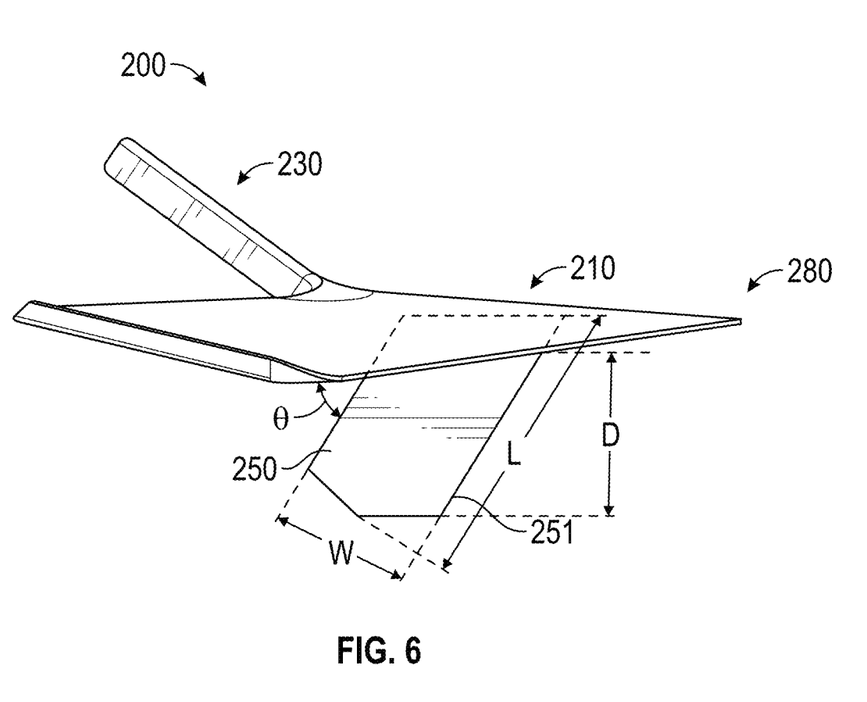
FIG. 6 is a side elevation view of the second alternative embodiment of the sweep, according to the present invention.
Figure 7:
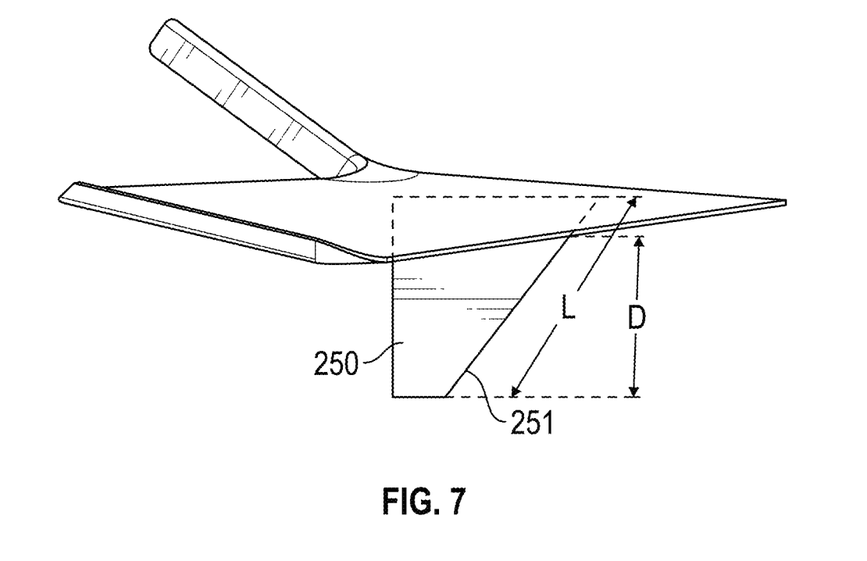
FIG. 7 is a side elevation view of a third alternative embodiment of the sweep.
Figure 8:
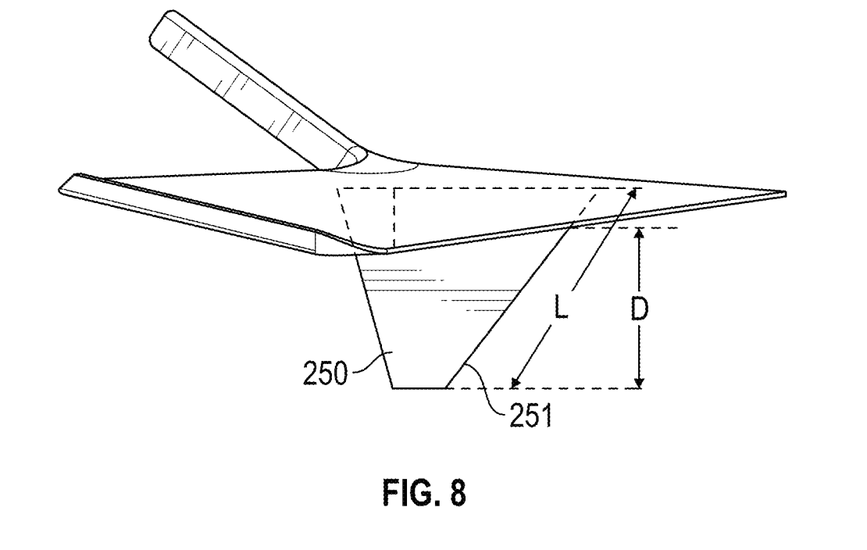
FIG. 8 is a side elevation view of a fourth alternative embodiment of the sweep.
Figure 9:
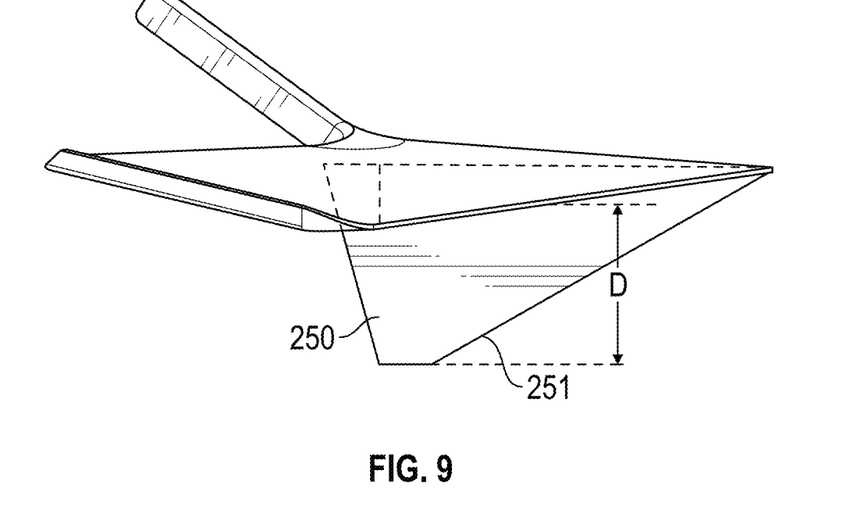
FIG. 9 is a side elevation view of a fifth alternative embodiment of the sweep.
Figure 10:
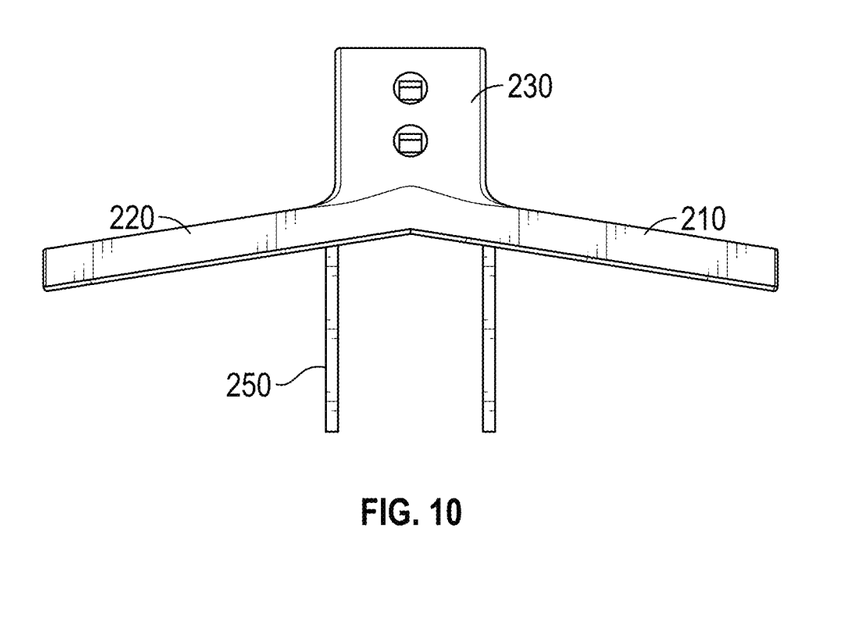
FIG. 10 is a front-end view of a sixth embodiment of the sweep.

The cultivator sweep 200 of FIGS. 1-4 has a conditioning element 250 in the form of a blade. The blade 250 has a leading edge 251, and may have, but is not required to have, a chamfered cut 255 at the beginning of the blade which may reduce a stress riser that may occur in the blade. The blade may attach to an underside of the cultivator body by a conventional method such as, but not limited to, welding. Although FIGS. 1-4 illustrate the cultivator sweep 200 as having a single blade, the invention is not limited thereto. For example, additional blades may be placed in parallel with the blade shown in FIGS. 1-4. In addition, while FIGS. 1-4 illustrate a single blade attached in the center line of the body at the juncture of the first and second wings 210 and 220, the invention is not limited thereto as one or more blades may be positioned offset from a middle of the sweep. For example, FIG. 9 illustrates a cross section of a sweep 200 having two parallel blades. The conditioning element 250 may be made from a rectangular metal plate cut to have the general shape of the blade shown in FIGS. 1-4, with parallel leading and trailing edges. This, however, is not meant to limit the invention. For example, as shown in FIG. 3, the blade may resemble a substantially triangular shape and FIG. 4 shows the blade as having a trapezoidal shape. In each of these latter embodiments the blades have constant thickness, as though they were manufactured from a plate, or a varying thickness. As another embodiment, in FIG. 5, the blade is shown having a leading edge 251 extending to the nose of the sweep 200.

In the preferred embodiment, a depth D of the blade below the wings should be approximately two inches or longer, preferably, in the range of two to three inches, as shown in FIG. 1. The two inch length provides for efficient vertical tillage. Furthermore, sweep 200 may be substantially symmetrical about a line of symmetry as shown in FIG. 2 to further promote a stabile strong structure. Further yet, thickness of the conditioning blade 250 and the thickness of the wings 210 and 220 may be about the same and may be about ⅜ inch to promote event wear of the sweep 200. While the thickness of ⅜ of an inch is presented herein, it is done so merely for the purpose of illustration as the thickness of the blade may be more or less than ⅜ inch, for example ¼ inch or ⅛ inch.

As shown in FIG. 1, the angle Θ of the leading edge 251 of the conditioning element 250 makes with the wing body may be about 30° to about 45°, and preferably about 35° to about 60°, and more preferably, between 40° and 50°. For vertical tillage, it is desirable that the angle Θ be sufficient to allow the blade to slice through the ground rather than as a structure which displaces soil sideways (which may occur if the blade was relatively thick and had a vertical leading edge). Furthermore, the length of the blade may be chosen to control the depth of the slit in the ground. For example, in vertical tillage applications, the length of the blade may be chosen so the depth D of the blade below the wing body is about three inches. The action of slicing though the ground to a depth of about 3 inches prevents incorporation of reside as would be incorporated using a horizontal tool. It is noted the above dimensions are not intended to limit the invention. For example, the blade length may be chosen so that D is larger than three inches or less than three inches.

The conditioning element 250, when in blade form as shown in FIGS. 1-4, may be offset from a nose 280 of the wing body. In use, the nose 280 of the sweep 200 may cause some soil to displace. However, because the conditioning element 250 may be offset from the nose 280, for example, by one to six inches, the blade would be passing though disrupted soil and making a slit in the disrupted soil rather than creating an additional disruption to the soil. The slit facilitates root growth in a downward direction, rather than a sideways direction.

Figure 14A:
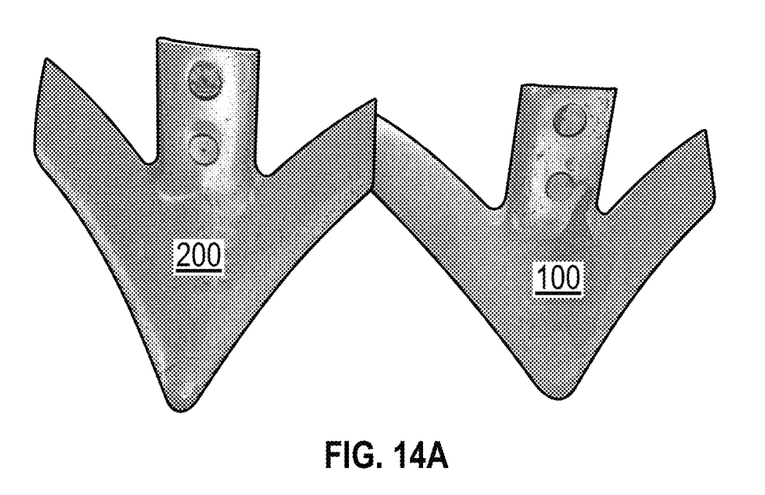
FIGS. 14A and 14B are photographs from the top and bottom, respectively, showing applicant's sweep on the left and a conventional prior art sweep on the right, after a field test of the sweeps to compare the wear after 500 acres (approximately) of use.
Figure 14B:
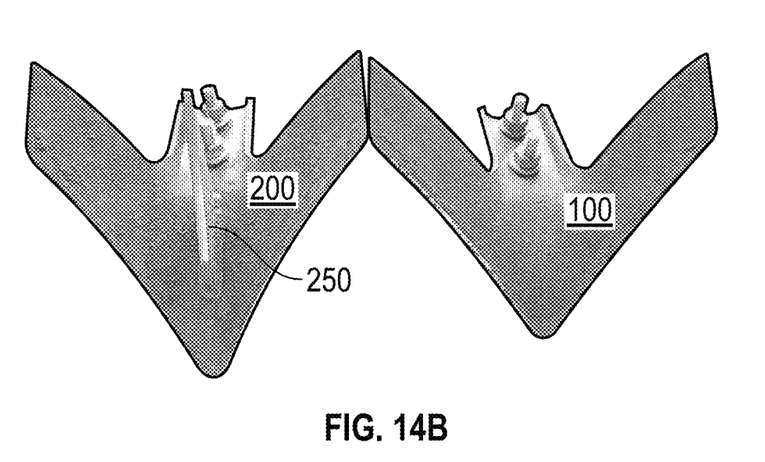

Applicant field tested the cultivator sweep 200 of FIGS. 1-4 and obtained some surprising results. First, Applicant noticed the noise generated by the farming equipment to which the sweep 200 was attached was less than the noise generated by the farming equipment when a conventional sweep 100 is attached. The reduction in noise is believed to be an indicia of less stress exerted on the farming equipment when the cultivator weep 200 passes through the soil. Furthermore, Applicant ran a side-by-side test of the embodiment illustrated in FIGS. 1-4 against a conventional sweep 100. Each cultivator sweep 200 and 100 was substantially identical except the cultivator sweep 200 included the conditioning element 250 in blade form. Each cultivator weep 200 and 100 was run through approximately 500 acres of farmland, on the same machine, at the same time. Thus, the soil and weather conditions for each sweep were substantially identical. FIGS. 14A and 14B illustrate the sweeps 200 and 100 after the test with FIG. 14A illustrating a top view of the sweeps 200 and 100 and FIG. 14B illustrating bottom views of the sweeps 200 and 100. As shown in FIGS. 14A and 14B, Applicant's sweep 200 showed significantly less material loss on the wings than the convention sweep 100. Applicant believes the difference in wear is a direct result of the addition of the conditioning element 250 in blade form. When the blade 250 is attached to the sweep body of the cultivator sweep 200, the conditioning element 250 acts as a rudder which not only breaks up compacted soil but also stabilizes the sweep 200 as it passes though the ground. The sweep 200, stabilized by the conditioning element 250, vibrates less and keeps the sweep from bouncing around, a problem often observed with conventional sweeps 100. Thus, the stabilization reduces shock and vibration which reduces material loss in the body of the sweep 200.

Figure 11A:
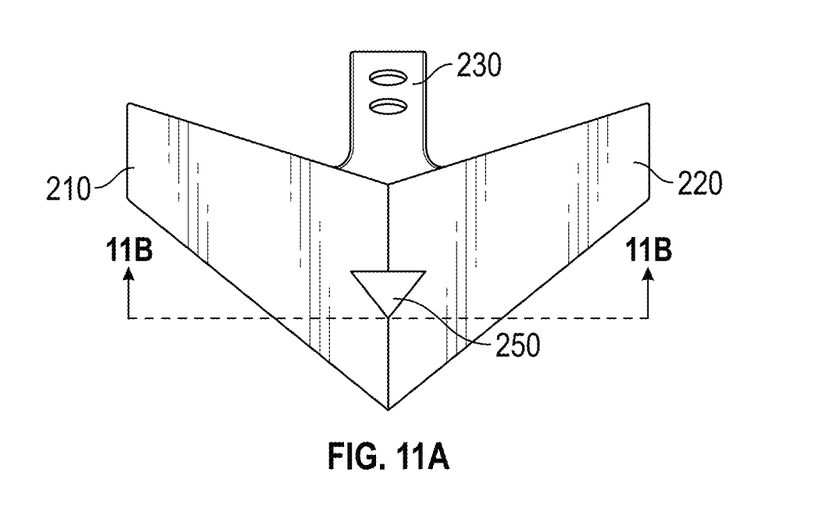
FIG. 11A is a bottom plan view of a seventh embodiment of the sweep.
Figure 11B:
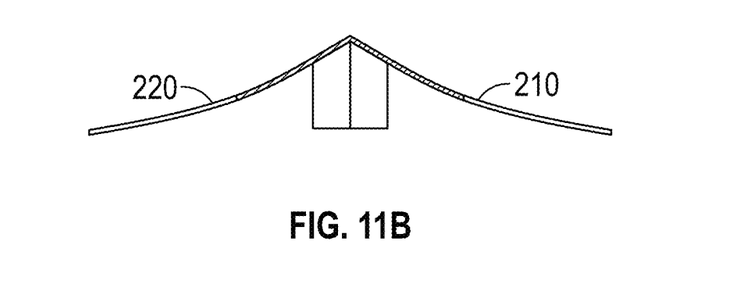
FIG. 11B is a cross sectional view taken along the lines B-B of FIG. 11A.
Figure 11C:
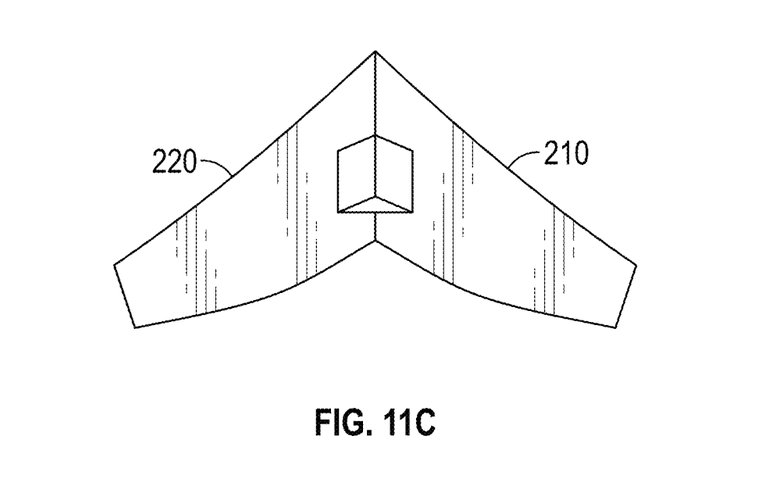
FIG. 11C is a bottom perspective view of the sweep shown in FIG. 11A.
Figure 12:
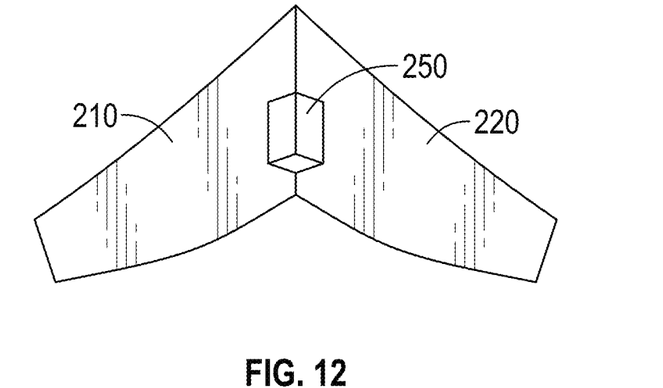
FIG. 12 is a bottom perspective view of an eighth embodiment of the sweep, according to the present invention.
Figure 13:
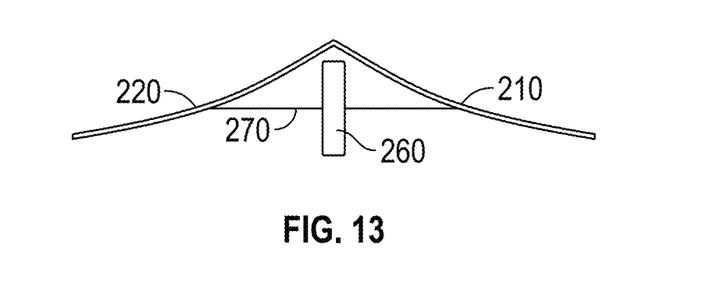
FIG. 13 is front elevation view of a ninth embodiment of the sweep, according to the present invention.

FIGS. 11A-11C show another alternative embodiment of the cultivator sweep 200 with a conditioning element 250A. In FIGS. 11B, the conditioning element 250A has a triangular cross section. As shown in FIG. 12, an alternative conditioning element 250B has a rectangular cross section. FIG. 13 shows another embodiment of a conditioning element 250C resembling a fluted coulter 260 which is rotationally supported by the wings 210 and 220, for example, by a shaft 270.

Applicant notes the inventive sweep 200 with any embodiment of the conditioning element may be used in various locations and for various purposes. For example, one embodiment may be used behind tractor wheels to reduce, if not eliminate, soil compaction which may be created by a tractor. In another application, the sweeps 200 may be offset from the tractor wheels and therefore may be used to break compacted soil which naturally occurs with conventional sweeps 100. Regardless, the presence of the conditioning element 250, especially in blade form, reduces wear and tear on any agricultural equipment it is attached to while at the same time, reducing if not eliminating soil compaction.

From the foregoing, it can be seen that the present invention accomplishes at least all of its stated objectives.

What is claimed is:

1. A field cultivator sweep comprising:
opposite laterally extending wings having opposite upper and lower surfaces and defining a forward end and a rearward end of the wings;
a neck extending upwardly from the wings; and
a blade welded to and extending downwardly from the lower surface of the wings apart from the neck, extending longitudinally along the wings in a vertical plane centered between the wings, and having a leading edge and a trailing edge both extending rearwardly from top to bottom between 30-60 degrees;
wherein the entire blade resides below the lower surface of the wings and between the forward and rearward ends of the wings.

2. The field cultivator sweep of claim 1 wherein the blade extends below the wing at least 2 inches.

3. The field cultivator sweep of claim 1 wherein the blade is planar.

4. The field cultivator sweep of claim 3 wherein the blade has a thickness of approximately ⅜ inches.

5. The field cultivator sweep of claim 4 wherein the blade has a constant thickness.

6. The field cultivator sweep of claim 1 wherein the wings form a front nose and the leading edge of the blade is spaced rearwardly from the nose.

7. The field cultivator sweep of claim 1 wherein the blade resides in front of the neck.

8. The field cultivator sweep of claim 1 wherein the leading and trailing edges of the blade are substantially parallel to one another.

9. A sweep for cultivating soil in a field, comprising:
opposite left and right wings joined at a center line to form a symmetrical body with a V-shaped leading edge and a rear end;
a neck extending upwardly from the symmetrical body for mounting the sweep to a cultivator;
a blade having an upper end secured along a longitudinal center line of the wings and a lower end with a chamfered cut, said blade extending vertically downwardly from the center line between the leading edge and the rear end, and said blade positioned parallel to the center line to vertically till the soil when the sweep is pulled through the soil; and
the blade having substantially parallel leading and trailing edges which slope rearwardly from top to bottom.

10. The sweep of claim 9 wherein the symmetrical body has a front nose and the blade is offset rearwardly from the nose.

11. The sweep of claim 9 wherein the blade has a leading edge which is angled rearwardly from top to bottom.

12. The sweep of claim 9 wherein the blade is flat.

13. The sweep of claim 9 wherein the blade resides in front of the neck.

14. The sweep of claim 9 wherein the leading and trailing edges of the blade both extend rearwardly from top to bottom.

15. The sweep of claim 9 wherein the leading and trailing edges of the blade slope rearwardly between 30-60 degrees.

* * * * *